United States Patent
Zhao

(10) Patent No.: US 12,542,483 B2
(45) Date of Patent: Feb. 3, 2026

(54) SWITCHED-CAPACITOR VOLTAGE CONVERTER

(71) Applicant: Southchip Semiconductor Technology (Shanghai) Co., Ltd., Shanghai (CN)

(72) Inventor: Wei Zhao, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 163 days.

(21) Appl. No.: 18/365,178

(22) Filed: Aug. 3, 2023

(65) Prior Publication Data

US 2024/0178751 A1    May 30, 2024

(30) Foreign Application Priority Data

Nov. 24, 2022 (CN) .......................... 202211485619.7

(51) Int. Cl.
*H02M 3/07* (2006.01)
*H02M 3/158* (2006.01)

(52) U.S. Cl.
CPC ............. *H02M 3/07* (2013.01); *H02M 3/158* (2013.01)

(58) Field of Classification Search
CPC ........ H02M 3/07; H02M 3/071; H02M 3/072; H02M 3/073; H02M 3/075; H02M 3/04; H02M 3/06; H02M 3/158; H02M 3/156; H02M 3/1563; H02M 3/157; H02M 3/1584

See application file for complete search history.

(56) References Cited

U.S. PATENT DOCUMENTS

| | | | | |
|---|---|---|---|---|
| 2010/0327832 A1* | 12/2010 | Nishida | ................. | H02M 3/156 323/282 |
| 2011/0043955 A1* | 2/2011 | Noda | .................... | H02H 9/046 361/56 |
| 2017/0093278 A1* | 3/2017 | Unno | ..................... | H02M 1/32 |

FOREIGN PATENT DOCUMENTS

| | | |
|---|---|---|
| CN | 206226263 | 6/2017 |
| CN | 110071634 | 7/2019 |
| CN | 112202436 | 1/2021 |
| CN | 112910235 | 6/2021 |

* cited by examiner

*Primary Examiner* — Nguyen Tran

(57) ABSTRACT

A switched-capacitor voltage converter includes a loop regulator module, a clamp transistor, and a clamp circuit. The loop regulator module is configured to monitor electrical parameters of an input terminal and an output terminal, and output a voltage to a gate of the clamp transistor based on electrical parameters to stabilize a voltage of an output terminal of the switched-capacitor voltage converter at a target value. The clamp circuit is connected between the two terminals of the clamp transistor, such that the voltage difference between the drain and the source of the clamp transistor is less than the withstand voltage of the clamp transistor.

14 Claims, 4 Drawing Sheets

(a)      (b)      (c)

SWITCHED-CAPACITOR VOLTAGE CONVERTER

CROSS-REFERENCE TO RELATED APPLICATION

This application claims the priority benefit of Chinese Patent Application No. 202211485619.7, filed on Nov. 24, 2022, the entire content of which is hereby incorporated by reference herein and made a part of this specification.

BACKGROUND

Technical Field

The present disclosure relates to the technical field of electronics, and in particular, relates to a switched-capacitor voltage converter.

Description of Related Art

Referring to FIG. 1, in a conventional switched-capacitor voltage converter, a transistor QA is connected between the input terminal and the reference terminal PMID. A substrate of the transistor QA is connected to a source of the transistor QA, that is, connected to the reference terminal PMID. A conduction direction of a parasitic diode in the transistor QA is from the reference terminal PMID to the input terminal. In this way, the input terminal and the output terminal of the switched-capacitor voltage converter are completely disconnected. In response to the switched-capacitor voltage converter operating, the loop regulator module is capable of monitoring a difference value between the output voltage $V_{out}$ and a corresponding target value, a difference value between the input current $I_{bus}$ and a corresponding target value, or difference values between the other parameters and corresponding target values, and regulating a gate voltage QA_GT of the transistor QA, such that a voltage difference between the reference terminal PMID and the input terminal is regulated. Variations of a voltage at the reference terminal PMID may induce variations of the output voltage $V_{out}$, the input current $I_{bus}$, or the other parameters, such that the output voltage $V_{out}$, the input current $I_{bus}$, or the other parameters are stabilized at their corresponding target values.

In terms of structure, a defect of the switched-capacitor voltage converter lies in that a withstand voltage of the transistor QA needs to exceed a maximum value of the input voltage $V_{bus}$; and as a result, the area of the transistor is large, and the cost is high.

SUMMARY

An object of various embodiments of the present disclosure is to provide a switched-capacitor voltage converter, such that a withstand voltage of a transistor does not exceed a maximum value of an input voltage $V_{bus}$, thereby reducing the area of the transistor and lowering the cost.

Some embodiments of the present disclosure provide a switched-capacitor voltage converter. The switched-capacitor voltage converter includes: a loop regulator module, a clamp transistor, and a clamp circuit. A gate of the clamp transistor is connected to a voltage output terminal of the loop regulator module, a drain of the clamp transistor is connected to an input terminal of the switched-capacitor voltage converter, a source of the clamp transistor is connected to a reference terminal of the switched-capacitor voltage converter, and the clamp circuit is connected between the source and the drain of the clamp transistor. The loop regulator module is configured to monitor electrical parameters of the input terminal and an output terminal of the switched-capacitor voltage converter, and output a voltage to the gate of the clamp transistor based on the electrical parameters to stabilize a voltage at the output terminal at a target value. The clamp circuit is configured to cause a voltage difference between the drain and the source of the clamp transistor to be less than or equal to a withstand voltage of the clamp transistor.

In some embodiments, the clamp circuit includes a first resistor, a first gate regulator element, a first diode, and a first transistor. A negative electrode of the first gate regulator element is connected to the drain of the clamp transistor, and a positive electrode of the first gate regulator element is connected to the source of the clamp transistor via the first resistor. A positive electrode of the first diode is connected to the drain of the clamp transistor, a negative electrode of the first diode is connected to a drain of the first transistor, a source of the first transistor is connected to the gate of the clamp transistor, and a gate of the first transistor is connected to the positive electrode of the first gate regulator element.

In some embodiments, the first gate regulator element includes a Zener diode or series-connected diodes or series-connected transistors.

In some embodiments, the first gate regulator element includes n series-connected transistors, n being an integer greater than or equal to 2. A drain and a gate of a first-ranked one of the n series-connected transistors are both connected to the drain of the clamp transistor, a source of a previous one of the n series-connected transistors is connected to a drain and a gate of a next one of the n series-connected transistors, a source of an $n^{th}$-ranked one of the n series-connected transistors is connected to the first resistor, and the previous one of the n series-connected transistors is any of the n series-connected transistors other than the $n^{th}$-ranked one of the n series-connected transistors.

In some embodiments, the first gate regulator element includes n series-connected diodes, n being an integer greater than or equal to 2. A positive electrode of a first-ranked one of the n series-connected diodes is connected to the drain of the clamp transistor, a negative electrode of a previous one of the n series-connected diodes is connected to a positive electrode of a next one of the n series-connected diodes, a negative electrode of an $n^{th}$-ranked one of the n series-connected diodes is connected to the first resistor, and the previous one of the n series-connected diodes is any of the n series-connected diodes other than the $n^{th}$-ranked one of the n series-connected diodes.

In some embodiments, the clamp circuit includes a second resistor, a second gate regulator element, a second diode, and a second transistor. A positive electrode of the second gate regulator element is connected to the source of the clamp transistor, and a negative electrode of the second gate regulator element is connected to the drain of the clamp transistor via the second resistor. A negative electrode of the second diode is connected to the gate of the clamp transistor, a positive electrode of the second diode is connected to a drain of the second transistor, a source of the second transistor is connected to the drain of the clamp transistor, and a gate of the second transistor is connected to the negative electrode of the second gate regulator element.

In some embodiments, the second gate regulator element includes a Zener diode or a series-connected diode or a series-connected transistor.

In some embodiments, the second gate regulator element includes n series-connected transistors, n being an integer greater than or equal to 2. A source of a first-ranked one of the n series-connected transistors is connected to the second resistor, a drain and a gate of a previous one of the n series-connected transistors are both connected to a source of a next one of the n series-connected transistors, a drain and a gate of an $n^{th}$-ranked one of the n series-connected transistors are both connected to the source of the clamp transistor, and the previous one of the n series-connected transistors is any of the n series-connected transistors other than the $n^{th}$-ranked one of the n series-connected transistors.

In some embodiments, the second gate regulator element includes n series-connected diodes, n being an integer greater than or equal to 2. A positive electrode of a first-ranked one of the n series-connected diodes is connected to the second resistor, a negative electrode of a previous one of the n series-connected diodes is connected to a positive electrode of a next one of the n series-connected diodes, a negative electrode of an $n^{th}$-ranked one of the n series-connected diodes is connected to the source of the clamp transistor, and the previous one of the n series-connected diodes is any of the n series-connected diodes other than the $n^{th}$-ranked one of the n series-connected diodes.

In some embodiments, the switched-capacitor voltage converter further includes: a switched-capacitor voltage conversion circuit connected between the reference terminal and the output terminal; and the reference terminal is an input terminal of the switched-capacitor voltage conversion circuit.

In some embodiments, the switched-capacitor voltage conversion circuit is a two-way 2:1 switched-capacitor voltage conversion circuit.

In some embodiments, the switched-capacitor voltage conversion circuit includes a first branch and a second branch; one terminal of the first branch is connected to the reference terminal, and the other terminal of the first branch is connected to the ground; and one terminal of the second branch is connected to the reference terminal, and the other terminal of the second branch is connected to the ground.

In some embodiments, the first branch includes a first switched capacitor, and a first switch transistor, a second switch transistor, a third switch transistor, and a fourth switch transistor that are successively connected in series. The series-connected second switch transistor and third switch transistor are connected in parallel to the first switched capacitor. The second branch includes a second switched capacitor, and a fifth switch transistor, a sixth switch transistor, a seventh switch transistor, and an eighth switch transistor that are successively connected in series. The series-connected sixth switch transistor and seventh switch transistor are connected in parallel to the second switched capacitor.

In some embodiments, a first connection point of the first branch and a second connection point of the second branch are both connected to the output terminal, the first connection point is a connection point between the second switch transistor and the third switch transistor, and the second connection point is a connection point between the sixth switch transistor and the seventh switch transistor.

In some embodiments, the switched-capacitor voltage converter further includes: a first substrate switching module, and a second substrate switching module. The first substrate switching module is connected to a substrate of the second switch transistor, and is configured to connect the substrate of the second switch transistor to the output terminal in response to the switched-capacitor voltage converter being in an operating state, and connect the substrate of the second switch transistor to the ground in response to the switched-capacitor voltage converter being in a non-operating state. The second substrate switching module is connected to a substrate of the sixth switch transistor, and is configured to connect the substrate of the sixth switch transistor to the output terminal in response to the switched-capacitor voltage converter being in the operating state, and connect the substrate of the sixth switch transistor to the ground in response to the switched-capacitor voltage converter being in the non-operating state.

In some embodiments, the input terminal of the switched-capacitor voltage conversion circuit is connected to the ground via a reference capacitor.

In some embodiments, the output terminal is connected to the ground via an output capacitor, and the output capacitor is connected in parallel to an output resistor.

According to the specific embodiments of the present disclosure, the switched-capacitor voltage converter includes: a loop regulator module, a clamp transistor, and a clamp circuit. A gate of the clamp transistor is connected to a voltage output terminal of the loop regulator module, a drain of the clamp transistor is connected to an input terminal of the switched-capacitor voltage converter, a source of the clamp transistor is connected to a reference terminal of the switched-capacitor voltage converter, and the clamp circuit is connected between the source and the drain of the clamp transistor. The loop regulator module is configured to monitor electrical parameters of the input terminal and an output terminal of the switched-capacitor voltage converter, and output a voltage to the gate of the clamp transistor based on the electrical parameters to stabilize a voltage at the output terminal at a target value. The clamp circuit is configured to control a voltage difference between the drain and the source of the clamp transistor to be less than or equal to a withstand voltage of the clamp transistor. According to the present disclosure, the clamp circuit is connected between the two terminals of the clamp transistor, such that the voltage difference between the drain and the source of the clamp transistor is less than the withstand voltage of the clamp transistor. In this way, the withstand voltage of the clamp transistor is reduced, the area of the transistor is decreased, and the cost is lowered.

BRIEF DESCRIPTION OF THE DRAWINGS

For clearer descriptions of the technical solutions in the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DESCRIPTION OF THE EMBODIMENTS

The technical solutions contained in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Figure 1:
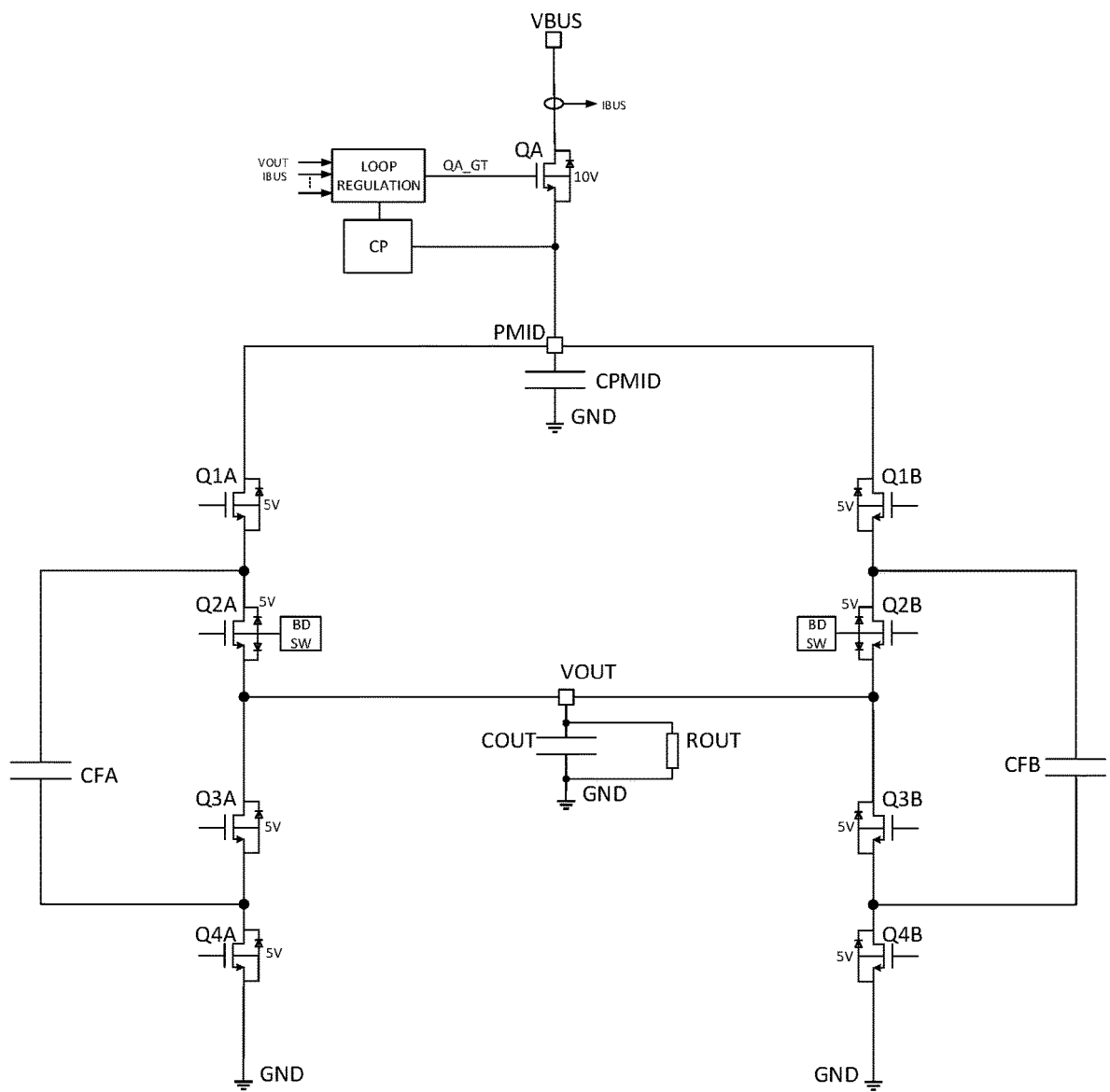
FIG. 1 is a circuit diagram of a conventional switched-capacitor voltage converter.

FIG. 1 is a circuit diagram of a switched-capacitor voltage converter according to the related art. An input terminal of the switched-capacitor voltage converter is connected to an input voltage $V_{bus}$, and an output terminal of the switched-capacitor voltage converter is connected to an output voltage $V_{out}$. For example, the input voltage $V_{bus}$ is 10 V, and the output voltage $V_{out}$ is 5 V. The switched-capacitor voltage converter satisfies two requirements: a) the input terminal and the output terminal are disconnected bidirectionally in response to the switched-capacitor voltage converter stopping operating; and (b) the output voltage $V_{out}$, an input current $I_{bus}$, or other parameters are adjustable, such that the output voltage $V_{out}$, the input current $I_{bus}$, or the other parameters are stabilized at corresponding target values.

A two-way 2:1 switched-capacitor voltage conversion circuit is connected between a reference terminal PMID and the output terminal of the switched-capacitor voltage converter. In the circuit, a substrate of a switch transistor Q1A, a substrate of a switch transistor Q3A, a substrate of a switch transistor Q4A, a substrate of a switch transistor Q1B, a substrate of a switch transistor Q3B, and a substrate of a switch transistor Q4B are respectively connected to sources of these transistors; and substrates of a switch transistor Q2A and a switch transistor Q2B are both connected to a substrate switching module BD SW. In response to the switched-capacitor voltage converter normally operating, the substrate switching module BD SW connects the substrate of the switch transistor Q2A to a source of the switch transistor Q2A, and connects the substrate of the switch transistor Q2B to a source of the switch transistor Q2B, that is, connecting both the substrate of the switch transistor Q2A and the substrate of the switch transistor Q2B to the output terminal. In response to the switched-capacitor voltage converter stopping operating, the substrate switching module BD SW connects both the substrate of the switch transistor Q2A and the substrate of the switch transistor Q2B to the ground GND. In this way, in response to the switched-capacitor voltage converter stopping operating, the output terminal is not conducted with the reference terminal PMID, and the reference terminal PMID is not conducted to the output terminal, such that the output terminal is completely disconnected from the reference terminal PMID.

In the switched-capacitor voltage converter, a transistor QA is connected between the input terminal and the reference terminal PMID. A substrate of the transistor QA is connected to a source of the transistor QA, that is, connected to the reference terminal PMID. A conduction direction of a parasitic diode in the transistor QA is from the reference terminal PMID to the input terminal. In this way, the input terminal and the output terminal of the switched-capacitor voltage converter are completely disconnected. In response to the switched-capacitor voltage converter operating, the loop regulator module is configured to monitor a difference value between the output voltage $V_{out}$ and a corresponding target value, a difference value between the input current $I_{bus}$ and a corresponding target value, or difference values between the other parameters and corresponding target values, and regulate a gate voltage QA_GT of the transistor QA, such that a voltage difference between the reference terminal PMID and the input terminal is regulated. Variations of a voltage at the reference terminal PMID may induce variations of the output voltage $V_{out}$, the input current $I_{bus}$, or the other parameters, such that the output voltage $V_{out}$, the input current $I_{bus}$, or the other parameters are stabilized at their corresponding target values. In terms of structure, a defect of the switched-capacitor voltage converter lies in that a withstand voltage of the transistor QA needs to exceed a maximum value of the input voltage $V_{bus}$, and as a result, the area of the transistor is large, and the cost is high.

Therefore, embodiments of the present disclosure provide a switched-capacitor voltage converter, such that the withstand voltage of the transistor does not exceed the maximum value of an input voltage $V_{bus}$, thereby reducing the area of the transistor and lowering the cost.

To make the objectives, features, and advantages of the present disclosure clearer and more understandable, the present disclosure is described in detail with reference to the attached drawings and specific embodiments.

Figure 2:
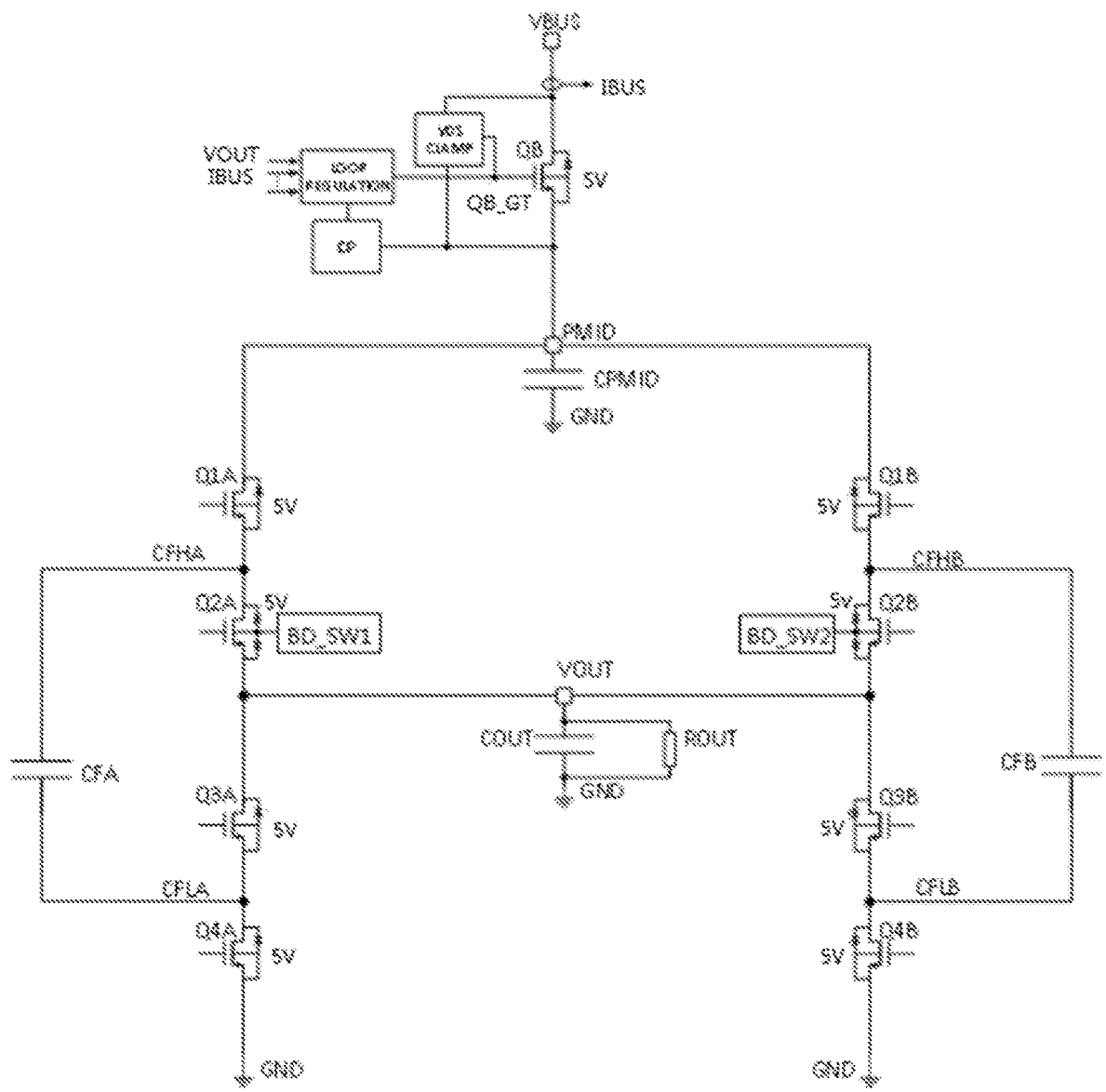
FIG. 2 is a circuit diagram of a switched-capacitor voltage converter according to an embodiment of the present disclosure.

As illustrated in FIG. 2, the switched-capacitor voltage converter according to an embodiment of the present disclosure includes: a switched-capacitor voltage conversion circuit, a loop regulator module, a clamp transistor QB, and a clamp circuit VDS CLAMP.

A gate of the clamp transistor QB is connected to a voltage output terminal of the loop regulator module, a drain of the clamp transistor QB is connected to an input terminal of the switched-capacitor voltage converter, and a source of the clamp transistor QB is connected to a reference terminal PMID of the switched-capacitor voltage converter. The input terminal of the switched-capacitor voltage converter is connected to an input voltage $V_{BUS}$, and an output terminal of the switched-capacitor voltage converter is connected to an output voltage $V_{OUT}$. The clamp circuit VDS CLAMP is connected between the source and the drain of the clamp transistor QB. VDS represents a voltage difference between the drain and the source of the clamp transistor QB.

The loop regulator module is configured to monitor electrical parameters of the input terminal and the output terminal of the switched-capacitor voltage converter, and output a voltage to the gate of the clamp transistor QB based on the electrical parameters to stabilize a voltage at the output terminal at a target value. In this embodiment, the voltage at the output terminal is the output voltage $V_{out}$, and by stabilizing the voltage at the output terminal at the target value, the output voltage $V_{out}$ is less than or equal to the target value. In this embodiment, the electrical parameters may include an output voltage $V_{out}$, an input current $I_{bus}$, or other parameters.

The clamp circuit VDS CLAMP is configured to control a voltage difference VDS between the drain and the source of the clamp transistor QB to be less than a withstand voltage of the clamp transistor QB.

Hereinafter, the switched-capacitor voltage converter as illustrated in FIG. 2 is described using the input voltage $V_{bus}$ being 10 V and the target value of the output voltage $V_{out}$ being 5 V as examples.

In this embodiment, the switched-capacitor voltage conversion circuit is connected between the reference terminal PMID and the output terminal, an input terminal of the switched-capacitor voltage conversion circuit is the reference terminal PMID, and the switched-capacitor voltage conversion circuit may be a two-way 2:1 switched-capacitor voltage conversion circuit. In other embodiments, according to actual needs, the switched-capacitor voltage conversion circuit may also be any other structure, not limited to the 2:1 structure.

As illustrated in FIG. 2, the two-way 2:1 switched-capacitor voltage conversion circuit includes a first branch and a second branch. One terminal of the first branch is connected to the reference terminal PMID, and the other terminal of the first branch is connected to the ground. One terminal of the second branch is connected to the reference terminal PMID, and the other terminal of the second branch is connected to the ground.

The first branch includes a first switched capacitor CFA, a first switch transistor Q1A, a second switch transistor Q2A, a third switch transistor Q3A, and a fourth switch transistor Q4A. The first switch transistor Q1A, the second switch transistor Q2A, the third switch transistor Q3A, and the fourth switch transistor Q4A are successively connected in series, and the series-connected second switch transistor Q2A and third switch transistor Q3A are connected in parallel to the first switched capacitor CFA. The second branch includes a second switched capacitor CFB, a fifth switch transistor Q1B, a sixth switch transistor Q2B, a seventh switch transistor Q3B, and an eighth switch transistor Q4B. The fifth switch transistor Q1B, the sixth switch transistor Q2B, the seventh switch transistor Q3B, and the eighth switch transistor Q4B are successively connected in series, and the series-connected sixth switch transistor Q2B and seventh switch transistor Q3B are connected in parallel to the second switched capacitor CFB.

A first connection point of the first branch and a second connection point of the second branch are both connected to the output terminal, the first connection point is a connection point between the second switch transistor Q2A and the third switch transistor Q3A, and the second connection point is a connection point between the sixth switch transistor Q2B and the seventh switch transistor Q3B. In this embodiment, the first connection point may be a middle point on a connection line between the second switch transistor Q2A and the third switch transistor Q3A, or may be any other point on the connection line between the second switch transistor Q2A and the third switch transistor Q3A; and the second connection point may be a middle point on the connection line between the sixth switch transistor Q2B and the seventh switch transistor Q3B, or may be any other point on the connection line between the sixth switch transistor Q2B and the seventh switch transistor Q3B. In this embodiment, the input terminal PMID of the switched-capacitor voltage conversion circuit is connected to the ground via a reference capacitor CPMID, and the output terminal of the switched-capacitor voltage converter is connected to the ground via an output capacitor COUT. The output capacitor COUT is connected in parallel to an output resistor ROUT.

A substrate of the first switch transistor Q1A is connected to a source of the first switch transistor Q1A, a substrate of the third switch transistor Q3A is connected to a source of the third switch transistor Q3A, a substrate of the fourth switch transistor Q4A is connected to a source of the fourth switch transistor Q4A, a substrate of the fifth switch transistor Q1B is connected to a source of the fifth switch transistor Q1B, a substrate of the seventh switch transistor Q3B is connected to a source of the seventh switch transistor Q3B, and a substrate of the eighth switch transistor Q4B is connected to a source of the eighth switch transistor Q4B. A substrate of the second switch transistor Q2A is connected to a first substrate switching module BD_SW1, and a substrate of the sixth switch transistor Q2B is connected to a second substrate switching module DB_SW2. In response to the switched-capacitor voltage converter being in a normal operating state, the first substrate switching module BD_SW1 is configured to connect the substrate of the second switch transistor Q2A to a source of the second switch transistor Q2A, that is, to the output terminal; and the second substrate switching module BD_SW2 is configured to connect the substrate of the sixth switch transistor Q2B to a source of the sixth switch transistor Q2B, that is, to the output terminal. In response to the switched-capacitor voltage converter being in a stopping state, the first substrate switching module BD_SW1 connects the substrate of the second switch transistor Q2A to the ground GND, and the second substrate switching module BD_SW2 connects the substrate of the sixth switch transistor Q2B to the ground GND. In this way, in response to the switched-capacitor voltage converter being in the stopping state, the output terminal is not conducted with the reference terminal PMID, and the reference terminal PMID is not conducted to the output terminal, such that the output terminal is completely disconnected from the reference terminal PMID.

In this embodiment, by connecting the substrate of the second switch transistor Q2A to the first substrate switching module BD_SW1 and connecting the substrate of the sixth switch transistor Q2B to the second substrate switching module BD_SW2, in response to the switched-capacitor voltage converter being in the stopping state, the output terminal is not conducted with the reference terminal PMID, and the reference terminal PMID is not conducted to the output terminal, such that the output terminal is completely disconnected from the reference terminal PMID.

The clamp transistor QB is connected between the input terminal and the reference terminal PMID. A substrate of the clamp transistor QB is connected to a source of the clamp transistor QB, that is, connected to the reference terminal PMID. A conduction direction of a parasitic diode in the clamp transistor QB is from the reference terminal PMID to the input terminal. In this way, the input terminal and the output terminal of the switched-capacitor voltage converter are completely disconnected. In response to the switched-capacitor voltage converter being in an operating state, the loop regulator module is configured to monitor a difference value between the output voltage $V_{out}$ and a corresponding target value, a difference value between the input current $I_{bus}$ and a corresponding target value, or difference values between the other parameters and corresponding target values. The output voltage $V_{out}$, the input current $I_{bus}$, or the other parameters shall not exceed their corresponding target values. The loop regulator module is configured to regulate a gate voltage QB_GT of the clamp transistor QB, such that a voltage difference between the reference terminal PMID and the input terminal is regulated. Variations of a voltage at the reference terminal PMID may induce variations of the output voltage $V_{out}$, the input current $I_{bus}$, or the other parameters, such that the switched-capacitor voltage converter is configured to stabilize the output voltage $V_{out}$, the input current $I_{bus}$, or the other parameters at their corresponding target values.

The clamp circuit VDS CLAMP is connected between the source and the drain of the clamp transistor QB. The clamp circuit VDS CLAMP clamps the voltage difference VDS between the drain and the source of the clamp transistor QB to a specific range. In the case that the voltage difference VDS between the drain and the source of the clamp transistor QB exceeds the range, the clamp circuit VDS CLAMP raises the gate voltage QB_GT of the clamp transistor QB, such that a source voltage of the clamp transistor QB is raised or a drain voltage of the clamp transistor QB is reduced. For example, as illustrated in FIG. 2, a withstand voltage of the clamp transistor QB is 5 V, and the clamp circuit VDS CLAMP may limit the voltage difference VDS between the drain and the source of the clamp transistor QB to about 5 V. In the case that the voltage difference VDS between the drain and the source of the clamp transistor QB exceeds 5 V, the clamp circuit VDS CLAMP raises the gate voltage QB_GT of the clamp transistor QB, such that the source voltage of the clamp transistor QB is raised to ensure that the voltage difference VDS between the drain and the source of the clamp transistor QB does not exceed 5 V.

According to the embodiments of the present disclosure, by connecting the clamp circuit VDS CLAMP between the two terminals of the clamp transistor QB, the withstand voltage of the clamp transistor QB only needs to satisfy the following two conditions:

(1) The withstand voltage of the clamp transistor QB exceeds a maximum voltage difference between the input terminal and the reference terminal PMID in response to the switched-capacitor voltage converter normally operating. For example, the maximum voltage difference between the input terminal and the reference terminal PMID is 0.5 V in response to the switched-capacitor voltage converter normally operating.

(2) A sum of the withstand voltage of the clamp transistor QB and a withstand voltage of the first switch transistor Q1A exceeds a maximum value of the input voltage $V_{bus}$, and a sum of the withstand voltage of the clamp transistor QB and a withstand voltage of the fifth switch transistor Q1B exceeds the maximum value of the input voltage $V_{bus}$.

In this embodiment, in response to the switched-capacitor voltage converter being in the operating state, in the case that the input voltage $V_{bus}$ is less than 5 V, the clamp circuit VDS CLAMP connected between the two terminals of the clamp transistor QB fails to function, and the voltage at the reference terminal PMID remains at 0; in the case that the input voltage $V_{bus}$ exceeds 5 V, the clamp circuit VDS CLAMP connected between the two terminals of the clamp transistor QB starts functioning, and the voltage at the reference terminal PMID is maintained at about a voltage value after the input voltage Vbus minus 5 V. Since the reference terminal PMID and the output terminal are completely disconnected, the input terminal and the output terminal of the switched-capacitor voltage converter are also completely disconnected. In addition, in response to the input voltage $V_{bus}$ reaching the maximum value 10 V, the voltage at the reference terminal PMID is 5 V, a voltage at a connection point CFHA between the first switched capacitor CFA and the first switch transistor Q1A is 0 V, a voltage at a connection point CFHB between the second switched capacitor CFB and the fifth switch transistor Q1B is 0 V, a voltage difference between the two terminals of the first switch transistor Q1A is about 5 V, a voltage difference between the two terminals of the fifth switch transistor Q1B is also about 5 V, and the voltages of all the switch transistors do not exceed their withstand voltages (for example, 5 V).

In response to the switched-capacitor voltage converter normally operating, the input terminal is connected to a voltage source, that is, the input terminal is connected to the input voltage $V_{bus}$, the output voltage $V_{out}$ is half of the voltage at the reference terminal PMID; and the loop regulator module is configured to monitor a difference value between the output voltage $V_{out}$ and a corresponding target value, a difference value between the input current $I_{bus}$ and a corresponding target value, or difference values between the other parameters and corresponding target values, and regulate a gate voltage QB_GT of the clamp transistor QB, such that a voltage difference between the reference terminal PMID and the input terminal is regulated. Variations of a voltage at the reference terminal PMID may induce variations of the output voltage $V_{out}$, the input current $I_{bus}$, or the other parameters. Therefore, the switched-capacitor voltage converter can regulate the output voltage $V_{out}$, the input current $I_{bus}$, or the other parameters, such that the output voltage $V_{out}$, the input current $I_{bus}$, or the other parameters are stabilized at their corresponding target values (for example, 5 V).

For example, in the case that the output voltage $V_{out}$ exceeds the corresponding target value, the loop regulator module may reduce the gate voltage QB_GT of the clamp transistor QB, and the source voltage of the clamp transistor QB may also be reduced, that is, the voltage at the reference terminal PMID may be reduced. Since the switched-capacitor voltage conversion circuit is a two-way 2:1 switched-capacitor voltage conversion circuit, the output voltage $V_{out}$ is half of the voltage of the reference terminal PMID, and the output voltage $V_{OUT}$ is correspondingly reduced. In this way, the switched-capacitor voltage converter can stabilize the output voltage $V_{out}$ at the corresponding target value.

Hereinafter, two typical structures of the clamp circuit VDS CLAMP are introduced.

(1) The clamp circuit VDS CLAMP includes a first resistor, a first gate regulator element, a first diode, and a first transistor. A negative electrode of the first gate regulator element is connected to the drain of the clamp transistor, and a positive electrode of the first gate regulator element is connected to the source of the clamp transistor via the first resistor. A positive electrode of the first diode is connected to the drain of the clamp transistor, a negative electrode of the first diode is connected to a drain of the first transistor, a source of the first transistor is connected to the gate of the clamp transistor, and a gate of the first transistor is connected to the positive electrode of the first gate regulator element.

(2) The clamp circuit VDS CLAMP includes a second resistor, a second gate regulator element, a second diode, and a second transistor. A positive electrode of the second gate regulator element is connected to the source of the clamp transistor, and a negative electrode of the second gate regulator element is connected to the drain of the clamp transistor via the second resistor. A negative electrode of the second diode is connected to the gate of the clamp transistor, a positive electrode of the second diode is connected to a drain of the second transistor, a source of the second transistor is connected to the drain of the clamp transistor, and a gate of the second transistor is connected to the negative electrode of the second gate regulator element.

In this embodiment, the first gate regulator element may include a Zener diode or series-connected diodes or series-connected transistors, the second gate regulator element may be a Zener diode or series-connected diodes or series-connected transistors, and other structures may also be applicable depending on requirements of different clamp voltages.

Hereinafter the above two types of clamp circuits are introduced using the first gate regulator element and the second gate regulator element being Zener diodes as an example.

Figure 3:
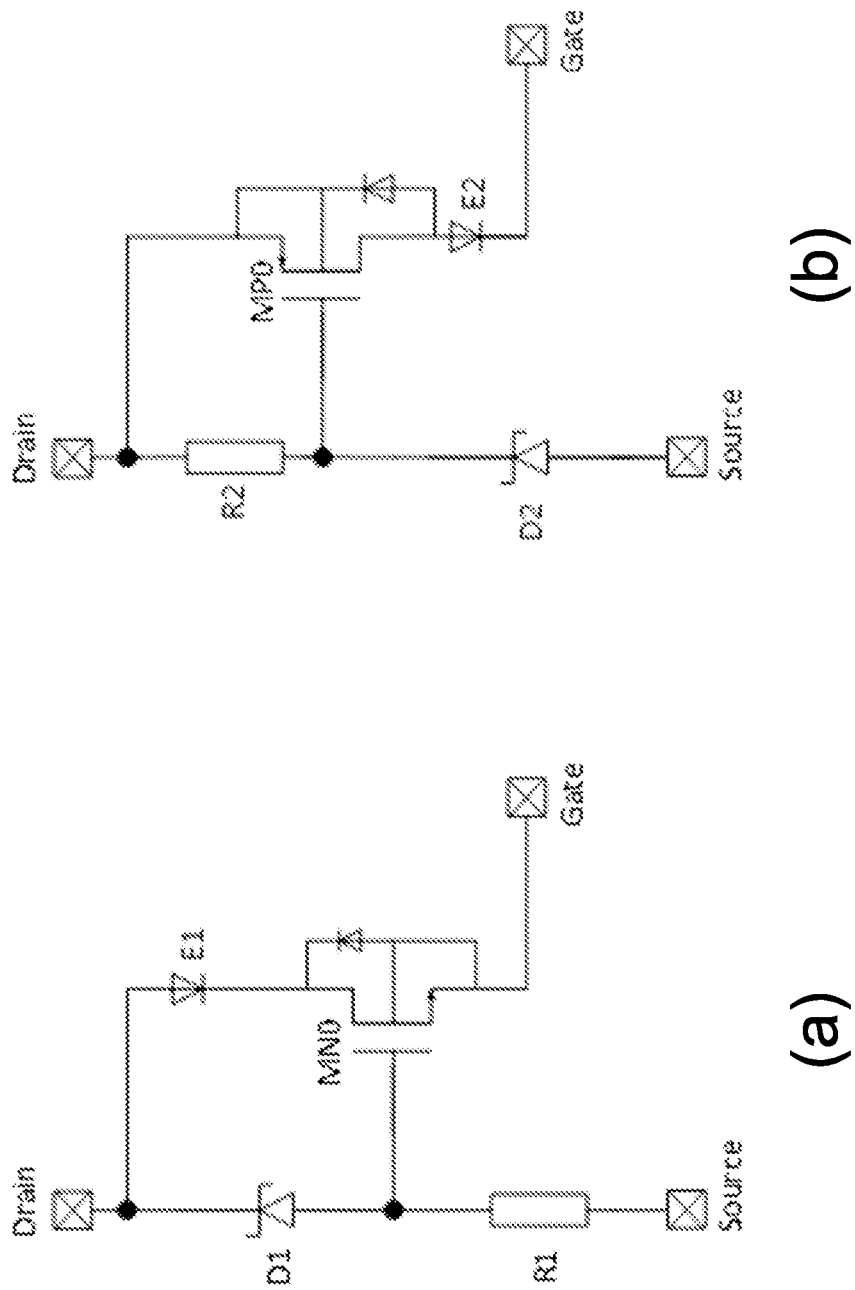
FIG. 3 is a circuit diagram of two clamp circuits according to an embodiment of the present disclosure.

As illustrated in (a) of FIG. 3, the clamp circuit VDS CLAMP includes a first resistor R1, a first Zener diode D1, a first diode E1, and a first transistor MN0.

With reference to both FIG. 2 and (a) of FIG. 3, a negative electrode of the first Zener diode D1 is connected to the drain of the clamp transistor QB, and a positive electrode of the first Zener diode D1 is connected to the source of the clamp transistor QB via the first resistor R1.

A positive electrode of the first diode E1 is connected to the drain of the clamp transistor QB, a negative electrode of the first diode E1 is connected to a drain of the first transistor MN0, a source of the first transistor MN0 is connected to the gate of the clamp transistor QB, a gate of the first transistor MN0 is connected to a positive electrode of the first Zener diode D1.

As illustrated in (b) of FIG. 3, the clamp circuit VDS CLAMP includes a second resistor R2, a second Zener diode D2, a second diode E2, and a second transistor MP0.

With reference to both FIG. 2 and (b) of FIG. 3, a positive electrode of the second Zener diode D2 is connected to the source of the clamp transistor QB, and a negative electrode of the second Zener diode D2 is connected to the drain of the clamp transistor QB via the second resistor R2.

A negative electrode of the second diode E2 is connected to the gate of the clamp transistor QB, a positive electrode of the second diode E2 is connected to a drain of the second transistor MP0, a source of the second transistor MP0 is connected to the drain of the clamp transistor QB, and a gate of the second transistor MP0 is connected to the negative electrode of the second Zener diode D2.

The function of the two types of clamp circuits as illustrated in FIG. 3 is to: in response to the voltage difference between the drain and the source of the clamp transistor QB exceeds a threshold, raise the voltage at the gate of the clamp transistor QB and thus raise the voltage at the source of the clamp transistor QB or reduce the voltage at the drain of the clamp transistor QB, so as to maintain the voltage difference between the drain and the source of the clamp transistor QB.

Specifically, with reference to both FIG. 2 and (a) of FIG. 3, in response to the voltage difference between the drain and the source of the clamp transistor QB exceeding a turn-on voltage of the first Zener diode D1, a voltage starts to be present at a connection point between the first resistor R1 and the first Zener diode D1, a gate voltage of the first transistor MN0 is raised, and the first transistor MN0 is configured to raise a source voltage of the first transistor MN0, that is, raise the gate voltage QB_GT of the clamp transistor QB.

Specifically, with reference to both FIG. 2 and (b) of FIG. 3, in response to the voltage difference between the drain and the source of the clamp transistor QB exceeding a turn-on voltage of the second Zener diode D2, a voltage starts to be present at a connection point between the second resistor R2 and the second Zener diode D2, a gate voltage of the second transistor MP0 is reduced, and the second transistor MP0 is configured to raise a drain voltage of the second transistor MP0, thereby raising the gate voltage QB_GT of the clamp transistor QB using the second diode D2.

In this embodiment, the Zener diode in FIG. 3 is only a first gate regulator element with a clamp voltage of 5 V. The first gate regulator element may also be other structures depending on different requirements on the clamp voltage. For example, the first gate regulator element may include series-connected diodes or series-connected transistors, or any other structure. Likewise, the second gate regulator element may also be other structures depending on the requirements on the clamp voltage, for example, series-connected diodes or series-connected transistors.

Figure 4:
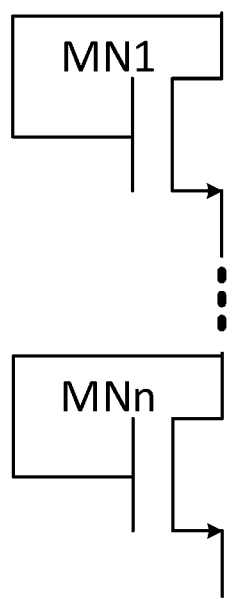
FIG. 4 is a diagram of connections of series-connected transistors and series-connected diodes according to an embodiment of the present disclosure.
Figure 4:
Figure 4:

Specifically, with reference to FIG. 3 and (a) of FIG. 4, the first Zener diode D1 may be replaced by n series-connected transistors ranked from MN1 to MNn, in the case that n≥2, and n is a positive integer. A drain and a gate of a 1st-ranked transistor MN1 are both connected to the drain of the clamp transistor QB, a source of a previous transistor MNm−1, which is ranked at an m−1$^{th}$ place, is connected to a drain and a gate of a next transistor MNm which is ranked at an m$^{th}$ place, in the case that 2≤m≤n, and m is an integer; and a source of an n$^{th}$-ranked transistor MNn is connected to the first resistor R1.

In the case that n=2, a drain and a gate of a 2$^{nd}$-ranked transistor MN2 are both connected to a source of the 1$^{st}$-ranked transistor MN1, and a source of the 2$^{nd}$-ranked transistor MN2 is connected to the first resistor R1. In the case that n≥3, the drain and the gate of the 2$^{nd}$-ranked transistor MN2 are both connected to the source of the 1st-ranked transistor MN1, and a source of an (n−1)$^{th}$-ranked transistor MNn−1 is connected to a drain and a gate of the n$^{th}$-ranked transistor MNn.

With reference to FIG. 3 and (b) of FIG. 4, the second Zener diode D2 may be replaced by n series-connected transistors ranked from MP1 to MPn, wherein n≥2, and n is a positive integer. A source of a 1st-ranked transistor MP1 is connected to the second resistor R2, a drain and a gate of a previous transistor MPm−1 which is ranked at an (m−1)$^{th}$ place are both connected to a source of a next transistor MPm which is ranked at an m$^{th}$ place, wherein 2≤m≤n, and m is an integer; and a drain and a gate of an n$^{th}$-ranked transistor MPn are both connected the source of the clamp transistor QB.

In the case that n=2, a drain and a gate of the 1st-ranked transistor MP1 are both connected to a source of a 2$^{nd}$ transistor MP2, and a drain and a gate of the 2$^{nd}$-ranked transistor MP2 are both connected to the source of the clamp transistor QB. In the case that n≥3, the drain and the gate of the 1st-ranked transistor MP1 are both connected to the source of the 2$^{nd}$-ranked transistor MP2, and a drain and a gate of an (n−1)$^{th}$-ranked transistor MPn−1 are both connected to a source of the n$^{th}$-ranked transistor MPn.

With reference to FIG. 3 and (c) of FIG. 4, the first Zener diode D1 may be replaced by n series-connected diodes ranked from Dz1 to Dzn, wherein n≥2, and n is a positive integer. A positive electrode of a 1st-ranked diode Dz1 is connected to the drain of the clamp transistor QB, a negative electrode of a previous diode Dzm−1 which is ranked at an (m−1)$^{th}$ place is connected to a positive electrode of a next diode Dzm which is ranked at an m$^{th}$ place, wherein 2≤m≤n, and m is an integer; and a negative electrode of an n$^{th}$-ranked diode Dzn is connected to the first resistor R1. The second Zener diode D2 may be replaced by n series-connected diodes Dz1 to Dzn, wherein n≥2, and n is a positive integer. A positive electrode of the 1$^{st}$-ranked diode Dz1 is connected to a 2$^n$-ranked resistor R2, a negative electrode of a previous diode Dzm−1 which is ranked at an (m−1)$^{th}$ place is connected to a positive electrode of a next diode Dzm, wherein 2≤m≤n, and m is an integer; and a negative electrode of the n$^{th}$-ranked diode Dzn is connected to the source of the clamp transistor QB.

In the case that n=2, a negative electrode of the 1$^{st}$-ranked diode Dz1 is connected to a positive electrode of a 2$^n$-ranked diode Dz2, and a negative electrode of a 2$^n$-ranked diode Dz2 is connected to the source of the clamp transistor QB. In the case that n≥3, the negative electrode of the 1st-ranked diode Dz1 is connected to the positive electrode of the 2$^{nd}$-ranked diode Dz2, and a negative electrode of an (n−1)$^{th}$-ranked diode Dzn−1 is connected to a positive electrode of the n$^{th}$-ranked diode Dzn.

The switched-capacitor voltage converter according to the embodiments of the present disclosure further includes a CP module. The clamp transistor QB according to the embodiments of the present disclosure is an NMOS transistor, which needs to be controlled using a greater voltage. The CP module is configured to raise the voltage at the reference terminal PMID. The raised voltage at the reference terminal PMID may be used to turn on or control the clamp transistor QB.

The switched-capacitor voltage converter according to the embodiments of the present disclosure satisfies the following three requirements.

(1) In response to the switched-capacitor voltage converter being in the operating state, the input terminal and the output terminal of the switched-capacitor voltage converter are bidirectionally disconnected, and thus mutual electric leakage may not occur.

(2) In response to the switched-capacitor voltage converter normally operating, the output voltage $V_{out}$, the input current $I_{bus}$, or the other parameters may be regulated, such that these electrical parameters are stabilized at the corresponding target values.

(3) The withstand voltage of all the switch transistors in FIG. 2 may all be equal to the output voltage $V_{out}$. For example, the withstand voltages of all the switch transistors and the output voltage $V_{out}$ are all 5 V.

Various embodiments in the specification are described in a progressive manner. The same or similar parts between the embodiments may be referenced to each other. In each embodiment, the portion that is different from other embodiments is concentrated and described.

In the specification, the principles and embodiments of the present disclosure are illustrated with reference to specific exemplary embodiments or examples. However, the description of the above embodiments is merely for ease of understanding of the method and core concept of the present disclosure. In the meantime, persons of ordinary skill in the art would derive variations or modifications to the present disclosure based on the concept of the present disclosure and the specific embodiments and application scope thereof. In conclusion, the content of the specification shall not be construed as limiting the present disclosure.

What is claimed is:

1. A switched-capacitor voltage converter, comprising: a loop regulator module, a clamp transistor, and a clamp circuit; wherein
    a gate of the clamp transistor is connected to a voltage output terminal of the loop regulator module, a drain of the clamp transistor is connected to an input terminal of the switched-capacitor voltage converter, a source of the clamp transistor is connected to a reference terminal of the switched-capacitor voltage converter, and the clamp circuit is connected between the source and the drain of the clamp transistor;
    the loop regulator module is configured to monitor electrical parameters of the input terminal and an output terminal of the switched-capacitor voltage converter, and output a voltage to the gate of the clamp transistor based on the electrical parameters to stabilize a voltage of the output terminal at a target value; and
    the clamp circuit is configured to control a voltage difference between the drain and the source of the clamp transistor to be less than or equal to a withstand voltage of the clamp transistor;
    a switched-capacitor voltage conversion circuit connected between the reference terminal and the output terminal of the switched-capacitor voltage converter, wherein the reference terminal is an input terminal of the switched-capacitor voltage conversion circuit.

2. The switched-capacitor voltage converter according to claim 1, wherein the clamp circuit comprises a first resistor, a first gate regulator element, a first diode, and a first transistor; wherein
    a negative electrode of the first gate regulator element is connected to the drain of the clamp transistor, and a positive electrode of the first gate regulator element is connected to the source of the clamp transistor via the first resistor; and
    a positive electrode of the first diode is connected to the drain of the clamp transistor, a negative electrode of the first diode is connected to a drain of the first transistor, a source of the first transistor is connected to the gate of the clamp transistor, and a gate of the first transistor is connected to the positive electrode of the first gate regulator element.

3. The switched-capacitor voltage converter according to claim 2, wherein the first gate regulator element comprises a Zener diode or series-connected diodes or series-connected transistors.

4. The switched-capacitor voltage converter according to claim 2, wherein the first gate regulator element comprises n series-connected transistors, and n is an integer greater than or equal to 2;
    wherein a drain and a gate of a first-ranked one of the n series-connected transistors are both connected to the drain of the clamp transistor, a source of a previous one of the n series-connected transistors is connected to a drain and a gate of a next one of the n series-connected transistors, a source of an nth-ranked one of the n series-connected transistors is connected to the first resistor, and the previous one of the n series-connected transistors is any of the n series-connected transistors other than the nth-ranked one of the n series-connected transistors.

5. The switched-capacitor voltage converter according to claim 2, wherein the first gate regulator element comprises n series-connected diodes, and n is an integer greater than or equal to 2;
    wherein a positive electrode of a first-ranked one of the n series-connected diodes is connected to the drain of the clamp transistor, a negative electrode of a previous one of the n series-connected diodes is connected to a positive electrode of a next one of the n series-connected diodes, a negative electrode of an nth-ranked one of the n series-connected diodes is connected to the first resistor, and the previous one of the n series-connected diodes is any of the n series-connected diodes other than the nth-ranked one of the n series-connected diodes.

6. The switched-capacitor voltage converter according to claim 1, wherein the clamp circuit comprises: a second resistor, a second gate regulator element, a second diode, and a second transistor; wherein
    a positive electrode of the second gate regulator element is connected to the source of the clamp transistor, and a negative electrode of the second gate regulator element is connected to the drain of the clamp transistor via the second resistor; and
    a negative electrode of the second diode is connected to the gate of the clamp transistor, a positive electrode of the second diode is connected to a drain of the second transistor, a source of the second transistor is connected to the drain of the clamp transistor, a gate of the second transistor is connected to the negative electrode of the second gate regulator element.

7. The switched-capacitor voltage converter according to claim 6, wherein the second gate regulator element comprises a Zener diode or series-connected diodes or series-connected transistors.

8. The switched-capacitor voltage converter according to claim 6, wherein the second gate regulator element comprises n series-connected transistors, and n is an integer greater than or equal to 2;

wherein a source of a first-ranked one of the n series-connected transistors is connected to the second resistor, a drain and a gate of a previous one of the n series-connected transistors are both connected to a source of a next one of the n series-connected transistors, a drain and a gate of an nth-ranked one of the n series-connected transistors are both connected to the source of the clamp transistor, and the previous one of the n series-connected transistors is any of the n series-connected transistors other than the nth-ranked one of the n series-connected transistors.

9. The switched-capacitor voltage converter according to claim 6, wherein the second gate regulator element comprises n series-connected diodes, and n is an integer greater than or equal to 2;

wherein a positive electrode of a first-ranked one of the n series-connected diodes is connected to the second resistor, a negative electrode of a previous one of the n series-connected diodes is connected to a positive electrode of a next one of the n series-connected diodes, a negative electrode of an nth-ranked one of the n series-connected diodes is connected to the source of the clamp transistor, and the previous one of the n series-connected diodes is any of the n series-connected diodes other than the nth-ranked one of the n series-connected diodes.

10. The switched-capacitor voltage converter according to claim 1, wherein the switched-capacitor voltage conversion circuit is a 2:1 switched-capacitor voltage conversion circuit which has two branches.

11. The switched-capacitor voltage converter according to claim 10, wherein the switched-capacitor voltage conversion circuit comprises a first branch and a second branch;
one terminal of the first branch is connected to the reference terminal of the switched-capacitor voltage converter, and the other terminal of the first branch is connected to a ground voltage; and
one terminal of the second branch is connected to the reference terminal of the switched-capacitor voltage converter, and the other terminal of the second branch is connected to the ground voltage;
wherein the first branch comprises:
 a first switched capacitor; and
 a first switch transistor, a second switch transistor, a third switch transistor, and a fourth switch transistor that are successively connected in series, wherein the second switch transistor and the third switch transistor which are series-connected are connected in parallel to the first switched capacitor;
wherein the second branch comprises:
 a second switched capacitor; and
 a fifth switch transistor, a sixth switch transistor, a seventh switch transistor, and an eighth switch transistor that are successively connected in series, wherein the sixth switch transistor and the seventh switch transistor which are series-connected are connected in parallel to the second switched capacitor;
wherein a first connection point of the first branch and a second connection point of the second branch are both connected to the output terminal, the first connection point is a connection point between the second switch transistor and the third switch transistor, and the second connection point is a connection point between the sixth switch transistor and the seventh switch transistor.

12. The switched-capacitor voltage converter according to claim 11, further comprising: a first substrate switching module, and a second substrate switching module; wherein the first substrate switching module is connected to a substrate of the second switch transistor, and is configured to connect the substrate of the second switch transistor to the output terminal in response to the switched-capacitor voltage converter being in an operating state, and connect the substrate of the second switch transistor to the ground voltage in response to the switched-capacitor voltage converter being in a non-operating state; and
the second substrate switching module is connected to a substrate of the sixth switch transistor, and is configured to connect the substrate of the sixth switch transistor to the output terminal in response to the switched-capacitor voltage converter being in the operating state, and connect the substrate of the sixth switch transistor to the ground voltage in response to the switched-capacitor voltage converter being in the non-operating state.

13. The switched-capacitor voltage converter according to claim 1, wherein the input terminal of the switched-capacitor voltage conversion circuit is connected to a ground voltage via a reference capacitor.

14. The switched-capacitor voltage converter according to claim 1, wherein the output terminal of the switched-capacitor voltage converter is connected to a ground voltage via an output capacitor, and the output capacitor is connected in parallel to an output resistor.

* * * * *